Feb. 19, 1957  A. WIMMER  2,782,115
PROCESS OF PRODUCING PIG IRON AND STEEL
Filed Aug. 24, 1953  2 Sheets-Sheet 1

INVENTOR:
Anton Wimmer
BY: Michael S. Striker
Agt.

United States Patent Office
2,782,115
Patented Feb. 19, 1957

2,782,115

PROCESS OF PRODUCING PIG IRON AND STEEL

Anton Wimmer, Hohenlimburg, Westphalia, Germany

Application August 24, 1953, Serial No. 376,163

8 Claims. (Cl. 75—40)

The manufacture of iron base compositions such as steel is generally carried out by the reduction of iron ore directly or indirectly by the use of carbon and oxides thereof. In the production of steel, blast furnaces are used in the manufacture of pig iron as a pre-product which is converted into steel in adjacent steel works by air blasts or open hearth furnace process after the addition of scrap iron.

It has been found that besides coal, other means may be used for the reduction of iron and other metallic oxides, these means being based upon the high affinity to oxygen of the substances used. High-grade metals and metal alloys have been produced by a so-called "aluminothermic" method for the manufacture of a weldable metal.

The present invention is based upon the production of iron and steel utilizing a metallic composition as combustible in the place of carbon.

It is therefore an object of the present invention to provide a process of producing iron and steel from iron-containing materials such as iron ore and/or scrap iron without the use of coal for the melting and reducing of the charge.

It is another object of the present invention to provide a process of producing iron and steel utilizing a metallic composition as combustible whereby the carbon content of the resultant product may be reduced to a very low amount.

It is still a further object of the present invention to provide a composition adapted to be used as a combustible in the place of carbon for the production of iron and steel.

It is still another object of the present invention to provide as a new composition of matter a steel alloy containing very little carbon.

Other objects and advantages of the present invention will be apparent from a further reading of the specification and of the appended claims.

The aluminothermic process cannot be utilized in the manufacture of iron and steel on a large scale. In the manufacture of iron and steel on a large scale it is necessary that the reducing elements be properly chosen and that special conditions which develop during the progress of the process be taken into account in the choosing of the reducing composition. Furthermore, pure aluminum is much too expensive for large scale production.

I have discovered that for the reduction of iron, certain mixtures or alloys of aluminum, silicon, titanium and iron and possibly other similar substances which have the high affinity to oxygen may be utilized in the place of pure aluminum if the substances are chosen in a certain ratio to each other. By the use of such compositions it is possible to produce iron and steel in large scale production on a metallothermic basis.

The use of the metal composition according to the present invention, which metal composition may be referred to herein also as "metal combustibles," besides causing the reduction of the iron oxide also causes, due to the high heat development connected with the combustion thereof, the melting of the iron charge and the molten separation of metal and slag. The slag may be drawn-off separately. The reduction takes place, contrary to the heat and reduction processes developed by standard steel making over the fixed carbon and gas phases, at exceedingly high speeds and with unusually high capacity.

With the above objects in view, the present invention mainly comprises the production of pig iron and steel, the steps of charging a furnace with an iron-containing material and with a composition essentially consisting of 20% of iron and titanium and the remainder of aluminum and silicon in an amount of 10–70% aluminum and 70–10% silicon, and burning in the furnace the composition, thereby melting and reducing the iron-containing material and forming a reduced molten iron.

The amount of iron in the metal combustible composition is preferably between 5–18% an the titanium between 2–10%. Most preferably the composition will contain 15% iron and 5% titanium.

The metal alloy combustible composition according to the present invention should preferably contain between 35–55% aluminum, 45–30% silicon, 10–25% iron and 2–15% titanium. More preferably, the composition should contain 40–50% aluminum, 40–30% silicon, 10–25% iron and 2–5% titanium.

Compositions within the following limits have been found to be highly satisfactory for the present invention:

30 up to 50% Si
55 down to 30% Al
18 down to 5% Fe
2 up to 10% Ti

Such alloys or metal combustibles, the degree of purity of which is more or less unimportant for the process in question can be obtained electrically, quickly and at a cheap rate from cheap raw materials, such as alumina, low grate coal with high percentage of ashes, boiler ashes, processing slag etc. if electric current can be supplied cheaply and in sufficient quantities. Big water plants or big power stations driven by cheap coal rich in ashes and eventually by atom power stations, may supply a favorable energy source for this purpose.

The boiler slag produced in big boiler plants when dealing with coal rich in ballast which has, besides, a considerable amount of iron oxides, a corresponding alumina and silicic acid content, offers a good and cheap residue which can be used for the making of metal combustibles of the present invention as raw material or as valuable addition to the other raw material inputs. There will be, therefore, a good possibility for big boiler plants to sell their large quantities of slag thus produced.

The iron content of metal combustibles of the iron oxides resulting from the electrical reduction can be from 10% to 25% and it supplies a valuable component for the development of the process.

The metal composition described here as "metal combustibles" can be marked, in comparison to coal or electric current, as another type of transformed energy, the input and use of which is subjected to special terms. The electric current can thus be accumulated in the metal combustibles in solid form, a fact which is especially valuable in times where electric current is in excess. The electric energy thus accumulated is also easily transportable in this shape. One is not bound to a certain place of manufacture if metal combustibles are to be manufactured for the making of steel but this place can be put down where electric current is available in large quantities and at a cheap rate. The higher space weight of the metal combustibles as compared to coke allows a better utilization of the transport room and by this a lowering of the freight rates based upon the transported heat quantity unit.

To carry through the metallothermic process, the metal combustibles are pulverized by suitable machines, or it may be only grained. In this shape it can be added, for instance, to the ore to be reducd on or to the melting bath. It is also possible, however, to use it in shape of slugs, in other words to mix it with small quantities of coal, coke, lime, or oil etc., and to press the mixture together to form solid bodies—or slugs. These slugs have the advantage, due to the initimate contact of the reactants, to obtain an increased reaction speed. By augmenting the tightness of the ore-metal combustibles mixture, the degree of efficiency can be considerably increased. For the acceleration of the reaction it is also permitted to provide an addition of low quantities of salts of the alkali or alkali earths. Finally it is possible to supply the metal combustibles to the bath at the beginning of the air blast process for getting a preferred slag formation and for getting a desulfurization by means of the blast, or it may be carried by oxygen, oxygen enriched air, or also by the way of alloying. On the other hand, it is of great advantage to supply the metal combustibles to the furnace or to the melting bath in mixture with neutral substances such as nitrogen, nitrogen enriched air and other combustion gases.

It may thus be seen that the composition may be added to the charge in any convenient form, i. e. in pulverized finely divided form, as grains, as molten liquid, or in the form of solid bodies of the iron ore and the metal combustible composition.

It may be a further advantage according to the present invention, for example in a case wherein a melting bath is used for the reaction so that the metal combustibles do not burn rapidly enough, to add an easily ignitable metal substance such as manganese or magnesia to the metal combustible composition. The addition of such substances facilitates the burning of the metal combustible composition and allows it to proceed more rapidly.

By means of the proposed metal combustibles, many different possibilities and ways are offered for the production of iron by the metallothermic process, without using coal as reduction means and without using reduction gases, as hitherto usual. The metal combustibles act, like carbon, simultaneously as reduction element and as heat carrier. It thus meets the conditions for performing a chemical job at high temperatures.

The metal combustibles of the described nature are therefore particularly well suited for the direct production of steel or of a low carbon pre-product form iron ores, without addition of coal. One mixes, for this purpose, suitable iron ores and additions with the metal combustibles of the invention in order to bring this mixture to a reaction by initial ignition on a pan or in a hearth, in a shaft furnace, in a rotary tube furnace or in a converter or in a drum mixer, either by a continuous or by an interrupted working method.

The process of reduction is effected in a very short time and there develops, as previously stated, a sufficient heat to make slag and metal liquid. Slag and metal are separated from each other in the usual way and can be tapped off separately in regular intervals or continuously as liquid masses.

Due to the excess of heat from the reaction process it is also possible and even necessary here, to add scrap in order to regulate the temperature. The invention described here is particularly well suited for dealing with iron ores or concentrates and sands without or with phosphorous, sulfur and silicic acid content, although generally such can only be treated with difficulty without previous preparation.

The following are results obtained in the production of iron by the process of the present invention utilizing the metal combustibles according to the present invention, the results consisting of analyses of the produced molten iron:

(1) Insignificantly soiled magnetite ore:

Analysis of the molten iron, without special slag guide, and additional bath movement:

NO. 840

| C, percent | Si, percent | Mn, percent | P, percent | S, percent |
|---|---|---|---|---|
| 0.37 | 0.66 | 0.10 | 0.045 | 0.029 |

(2) Insignificantly soiled magnetite ore with slag guide and mechanically operated bath movement by blowing in of nitrogen:

| C, percent | Si, percent | Mn, percent | P, percent | S, percent |
|---|---|---|---|---|
| 0.06 | 0.0 | 0.0 | 0.04 | 0.03 |
| ---- | 0.1 | 0.1 | ---- | ---- |

(3) Strongly soiled wet concentrates, mixed with Sweden concentrates. Analysis of the molten pre-product:

NO. 798

| C, percent | Si, percent | Mn, percent | P, percent | S, percent |
|---|---|---|---|---|
| 0.07 | 0.82 | 0.34 | 0.134 | 0.085 |

(4) Strongly soiled wet concentrates.
Analysis of the molten pre-product:

NO. 800

| C, percent | Si, percent | Mn, percent | P, percent | S, percent |
|---|---|---|---|---|
| 0.15 | 9.9 | 0.46 | 0.08 | 0.188 |

The accompanying materials, such as phosphorous, sulfur, manganese, silicon, chromium etc. can be kept in any desired percentage, according to the type of ores used and by adaptation to the further melting process which is intended. For comparison the following chemical compositions for standard Thomas and Bessemer pig iron are submitted.

THOMAS PIG IRON

| C | Si | Mn | P | S |
|---|---|---|---|---|
| 3.0-3.5 | 0.2-0.8 | 1.0-2.0 | 1.7-2.5 | 0.06-0.12 |

BESSEMER PIG IRON

| C | Si | Mn | P | S |
|---|---|---|---|---|
| 3.0-4.0 | 0.6-0.2 | 0.5-3.0 | 0.01-0.05 | 0.01-0.05 |

The pre-product made by the new process (1–3) differs considerably from the composition of pig iron which was usual hitherto and is outside the limits of the composition for the present-day steel making process. First, the carbon content can be kept within new low limits, to met customer's requirements so that the expenditure of time needed for its elimination during the manufacture of the steel can be substantially reduced.

One can therefore, by the use of the new process, put aside the previous analysis for the pre-product composition (pig iron) and the present invention, is, for this reason, much more independent, as far as the selection of raw materials is concerned.

For the practically complete utilization of the silicon contained in the metal combustibles it has proven to be of advantage to work with a certain excess of ore oxygen and, if necessary, to whirl around mechanically the molten system of steel-slag by wearing and refounding or by blowing through gases, for instance, neutral materials such as nitrogen.

Steel and slag are brought to a close contact with one another and because of this close contact of the particles connected therewith the combustion reaction of Mn, Si, C, P and so on runs quickly and entirely to an end with ore-oxygen of the slag in excess. If so desired, scale from the rolling mill process can be added to accelerate the combustion process.

From the balance of the endothermic and exothermic reactions of this process it results that considerable heat quantities are still available which, apart from replacing the heat losses, are used for melting scrap. In view of the fact that with the increasing sizes of the furnace system the utilization of this heat quantity becomes more favorable, it can be calculated, on the basis of actual tests, with a scrap addition of 30 to 50% of the molten iron.

According to a preferred embodiment of the present invention the ratio of iron ore to the metal combustible composition is so adjusted that the iron ore contains up to 15% more oxygen than the equivalent amount needed to oxidize the metal combustibles. The excess of oxygen in the iron ore is inversely proportional to the silicon content of the iron ore, and the higher the silicon content the lower the excess of oxygen.

The process of the present invention preferably carried out by first removing the slag from the molten iron, i. e. by tapping off, then further reducing the molten iron by means of additional amounts of the metal combustibles.

The reaction is preferably started by first introducing a blast of air or oxygen and about 1% of the metal combustibles composition into the furnace containing the iron ore and then further charging the furnace with the additional required amount of metal combustibles composition for the complete metallurgical process.

According to another embodiment of the present invention, the iron ore which generally contains carbon is subjected to treatment whereby the carbon is burned until the carbon content is no more than 0.01% and then the metal combustibles are charged in the furnace and the process continues in the customary manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
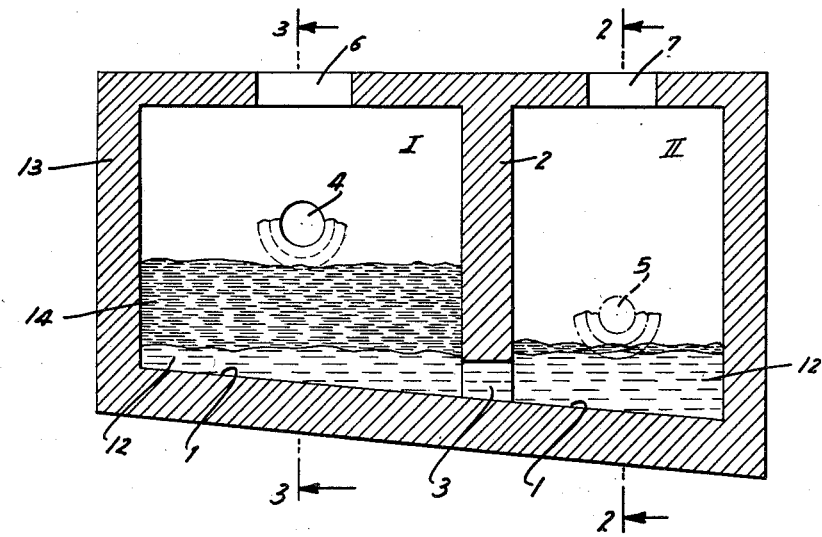
Fig. 1 is a longitudinal section of a furnace which may be utilized in carrying out the process of the present invention.
Figure 2:
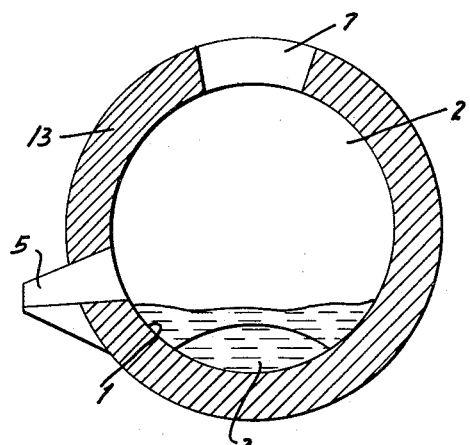
Fig. 2 is a cross section of the furnace of Fig. 1 taken along line 2—2.
Figure 3:
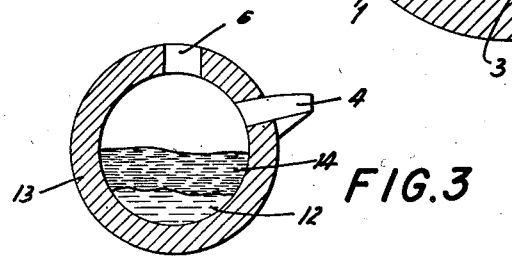
Fig. 3 is a cross section of the furnace of Fig. 1 taken along the line 3—3.

Referring to the drawings, and more particularly to Figs. 1–3, the furnace 13 is provided with an inclined bottom surface 1 and a partition wall 2 which is provided with an opening 3 connecting sections I and II of the furnace. Space or section II is provided with a tap 5 for the removal of the molten metal 12 which may be either a pre-metal or the steel itself. Through the opening 6, space or section I continuously or intermittently receives a mixture of ore and metal combustibles. In section I the direct reduction and melting of the steel and slag takes place and a molten slag 14 is formed above the molten metal 12.

The partition wall 2 is provided with an opening 3 at the bottom portion thereof which is so adjusted that the main part of the slag 14 is retained in section I while the molten metal 12 accumulates in section II. The molten metal 12 is tapped off through the tapping hole 5 in section II and the slag is tapped off through tapping hole 4 in section I. It is also possible to provide section II with an opening 7 through which new slag may be added to the steel bath 12 in section II in order to obtain homogeneity of the molten metal product.

Figure 4:
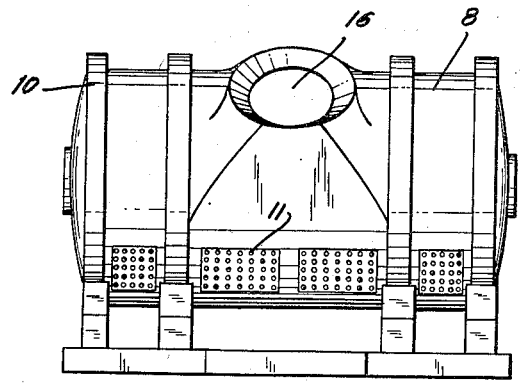
Fig. 4 is a front elevational view of a drum converter type of furnace for carrying out the process of the present invention.
Figure 5:
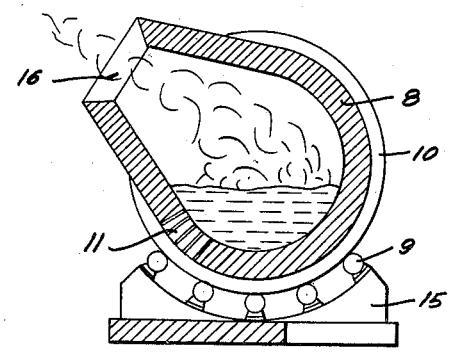
Fig. 5 is a cross sectional view of the furnace of Fig. 4 in one position.
Figure 6:
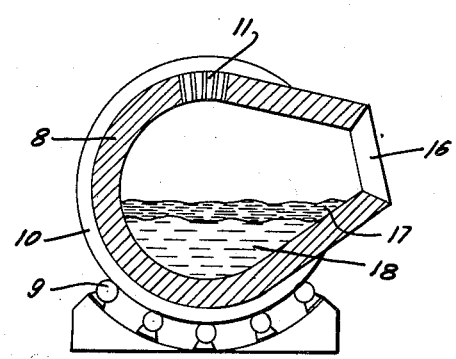
Fig. 6 is a cross sectional view of the furnace of Fig. 4 with the drum in another position.

Referring more particularly to Figs. 4–6 the drum converter 8 is mounted in projecting annular supporting rings 10 which are supported by rotatably mounted rollers 9 which in turn are supported on the stationary base 15. Air or other gas is blown into the drum converter 8 through gas inlets 11. The charge is introduced through charge and discharge opening 16.

The heating and reducing metallothermic reaction takes place when the converter is in the position shown in Fig. 5. After completion of this operation the converter is turned to the position shown in Fig. 6 whereby first the slag 17 and then the metal 18 may be removed.

Even the low shaft furnace with a low height and a large diameter is suitable to carry through the metallothermic reduction process in order to melt down a suitable pre-product in a direct way. For charging, either purverized material or slugs can be used. At the same time, corresponding quantities of scrap can be charged for cooling purposes. Its weight contributes to the fact that the charge can continuously slide down from above to below. The slag discharge can be provided continuously in this process similarly to the blast furnace. Additional nozzles are provided. If so desired, the metal combustibles can also be charged from the side by means of gas and mixed with solid additions, such as Cap etc., to the melting process in order to influence the reduction and the melting. The rotary tube furnace, too, can be well used for the process of the present invention.

The metallothermic process of the present invention allows also to adapt the present-day steel manufacturing process of the open hearth and air blast furnace to the new method and to increase their capacity both in respect to quantity and quality.

There is, for instance, in the open hearth process, a possibility after charging the furnace with a pre-product consisting either of pig iron of standard composition (Thomas pig iron, Bessemer pig iron etc.) or of a pre-product which, according to this invention, i. e. to the metallothermic principle, is made by direct way and which has a low carbon content to charge the molten metal sump either with an ore-metal combustibles mixture in normal or pressed form and with corresponding additions. The open hearth furnace may be more largely used than hitherto for the direct reaction work.

Due to the high reaction speed, the reduction process is effected in the open hearth furnace, after obtaining the ignition and reaction temperature, in the shortest possible time. The excess heat quantity set free in this case can be used for melting scrap without keeping the furnace under full gas at this time or using additional fuel. Therefore, the possibility exists, by the use of the metallothermic principle of the present invention in the open hearth furnace process, to reduce the melting and charging time considerably. Under these conditions, the production basing on a given furnace capacity, in relation to the shortest charging time, can be increased, which is equal to a corresponding increase of the production power.

Using the new process in an open hearth furnace the operating conditions may be as follows:

*Period 1.*—Pig iron or pre-metal input into the furnace at simultaneous gas supply.

*Period 2.*—Stopping of gas supply, input of ore-metal combustible mixture, either, in normal state or in slugs and additions, direct metallothermic ore reduction with a simultaneous melting down of corresponding scrap quantities for cooling purposes, and tapping-off of pre-slag. Prior to tapping-off the pre-slag it is also possible in order to whirl around bath and slag for increasing the reaction development, to move the system also from the side, from above or below by blowing in nitrogen or mechanically.

*Period 3.*—According to the development of this pre-melting after period 2, finishing of the melting operation at corresponding second slag work and, if needed, again gas supply.

*Period 4.*—Reduction in the furnace, if needed, by blowing through gas for whirling around the system, similarly as for the air blast process and as described hereafter.

It is also possible to carry through the metallothermic ore reduction of desired with scrap addition outside the hearth furnace in a pan or for instance in a mixer, to tap-off the slag produced thereby and to use the molten metal in an open hearth furnace as liquid output. In this event the pig iron input can be partly or entirely dispensed with. Finally, metal and slag can be tilted from the pan into the furnace for further metallurgical treatment.

According to the initial materials and additions used, the process can be either acid or basic. The lining of hearth and pan must be provided accordingly.

Also, for the air blast process the suggested metallothermic principle can be used.

Where small converters are used, it is customary to add aluminum at the beginning of the charge in order to obtain a high heat production. There are converters having a capacity of 1 to 2 tons, as used in steel foundries. For the big converters used in the steel industry, i. e. for converters of about 15 ton capacity and more, a metal mixture addition can be dispensed with to this end because there the heat losses are not so big as with the small converters. For these larger converters the process in question is quite new. It has also been shown that, if metal combustibles are added at the start of the melting, the sulfur content is considerably reduced.

As stated previously, the use of the metallothermic principle for the air blast process is particularly important if the metal combustibles carried by air, oxygen enriched air and pure oxygen are added at the beginning of the process for heating-up, preferred slag formation and desulfurisation, if desired even by way of alloying. Nitrogen, nitrogen enriched air, refined gases, such as argon or mixtures of nitrogen and refined gases, if desired also by the addition of water, steam and carbonic acid, are blown into the bath later on and towards the end of the process through nozzles from below, from the side and even from above. For the air blast process, too, there are various combined working methods that can be recommended both on the acid and basic basis of which the following methods are given as examples only.

*Period 1.*—The converter will be charged with Thomas pig iron, standard quality or with a low grade pig iron (for instance high S-content) or with a pre-metal with low carbon content which was obtained in a direct way metallothermically in a pan or in a mixer, with additions of about 1% of metal combustibles and blown in with air or oxygen for a few minutes up to the complete combustion of this metal combustible addition. The end of this short blowing period can be easily established at the time the short white narrow flame no longer appears. The strong exothermic heat development connected with this period leads to a quick overheating of the bath, to an early slag formation in this part of the process and to a high heat degree, thus favourably influencing principally the sulfur loss.

*Period 2.*—A short shifting of the converter has to take place and then the input of corresponding quantities of ore-metal combustible slug. The air supply is changed to neutral gas.

After the ignition of the reaction mixture, the direct ore reduction takes place in the converter to the metallothermic principle. The neutral gas results in a good whirling around of the bath and in the complete consumption of the metal combustibles by the offered ore oxygen. The already mentioned excess of oxygen of a few percent will make certain that there is a complete reaction of the metal combustibles.

During this period the considerable excess of heat produced can be used for melting down scrap and the converter can be utilized with its full capacity.

The direct metallothermic reduction can take place in this period. As soon as a liquefaction has taken place, the converter is set up and nitrogen blown in, in order to bring the metallothermic reaction to full effect by the available ore oxygen by means of a good whirling around.

*Period 3.*—After expiration of period 2 the slag which is poor in iron can first be drawn off and the charge will then be completely liberated from the still available but few accompanying materials, such as manganese, silicon, carbon, phosphorus etc. up to the lowest content by the input of new additions and by reversing of the air or oxygen. If need be, the reaction vessel must be exchanged if the input requires it, due to the high phosphorus content.

*Period 4.*—After the second slag has been carefully tapped off and after the input of a sinter soda mixture, the reversing from air to neutral gas takes place with a simultaneous input of metal combustibles in such small quantities that the oxygen available in the molten iron is completely bound and that the steel is washed free from FeO. The result should be obtained by this process that, in the last stages of the supplementary blowing operation to eliminate the lowest quantities of soiling, phosphorus and sulfur still go down considerably, but that the oxygen content in that part of the process should considerably increase.

Charges blast by this manufacturing process offer a particularly high degree of purity, which cannot be obtained otherwise. Necessary corrections in respect to manganese and silicon content can be made in the pan by the addition of low quantities of silicon, manganese etc., especially if a higher content of manganese in connection with very low carbon content is required. The usual reduction by ferro manganese, spiegel etc. which entails an undesirable carburization does not take place. The reduction products in the pan go down to a minimum and only low quantities of slag go into the moulds when the ingot is being poured. By this it will be possible to produce a steel having an extremely low content of carbon and oxygen while the other components can be kept in very low or in normal limits without being able, due to the existing silicon and aluminum content, to exercise a particularly dangerous effect.

According to the initial terms selected and to the kind of manufacture the compilation of the steel made by this process may vary as stated below:

| | |
|---|---|
| C | 0.05 and less |
| Mn | 0.4–0.05 |
| Si | 0.15–0.02 |
| Al | 0.06–0.02 |
| P | 0.06–0.01 |
| S | 0.03–0.01 |
| N | 0.016–0.002 |

The progress of manufacture described here, periods 1 to 4, is only an example for the working manner of the air blast process by the metallothermic principle and the possibility exists to change the process described from case to case in order to realize the aim required. For instance, the blowing operation at the beginning of the process, after addition of metal combustibles and the consecutive operation with slugs in a neutral gas atmosphere, i. e. period 1 to 2 can be completely dispensed with using only periods 3 to 4.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In the production of pig iron and steel, the steps of charging a furnace with an iron-containing material and with a composition essentially consisting of 20% of iron and titanium and the remainder of aluminum and silicon in an amount of 10–70% aluminum and 70–10% silicon and burning in the furnace said composition, thereby melting and reducing said iron-containing material and forming a reduced molten iron.

2. In the production of pig iron and steel, the steps of charging a furnace with an iron-containing material and with a composition essentially consisting of 20% of iron and titanium in an amount of 5–18% iron and 2–10% titanium and the remainder of aluminum and silicon in an amount of 10–70% aluminum and 70–10% silicon; and burning in the furnace said composition, thereby melting and reducing said iron-containing material and forming a reduced molten iron.

3. In the production of pig iron and steel, the steps of forming substantially solid bodies of an iron-containing material and a composition essentially consisting of 20% iron and titanium and the remainder of aluminum and silicon in an amount of 10–70% aluminum and 70–10% silicon; charging a furnace with the thus-formed solid bodies; and burning in the furnace said composition, thereby melting and reducing said iron-containing material and forming a reduced molten iron.

4. In the production of pig iron and steel, the steps of charging a furnace with an iron-containing material, with magnesia having a low point of combustion and with a composition essentially consisting of 20% of iron and titanium and the remainder of aluminum and silicon in an amount of 10–70% aluminum and 70–10% silicon; and burning in the furnace said composition, said magnesia facilitating said burning, thereby melting and reducing said iron-containing material and forming a reduced molten iron.

5. In the production of pig iron and steel, the steps of charging a furnace with iron ore and with a composition essentially consisting of 20% of iron and titanium and the remainder of aluminum and silicon in an amount of 10–70% aluminum and 70–10% silicon; and burning in the furnace said composition, thereby melting and reducing said iron ore and forming a reduced molten iron.

6. In the production of pig iron and steel, the steps of charging a furnace with iron ore and with a composition essentially consisting of 20% of iron and titanium and the remainder of aluminum and silicon in an amount of 10–70% aluminum and 70–10% silicon; and burning in the furnace said composition while adding scrap iron to regulate the temperature, thereby melting and reducing said iron ore and forming a reduced molten iron.

7. In the production of pig iron and steel, the steps of charging a furnace with iron ore and with a composition essentially consisting of 20% of iron and titanium and and the remainder of aluminum and silicon in an amount of 10–70% aluminum and 70–10% silicon, the ratio of said iron ore to said composition being so adjusted that said iron ore contains up to 15% more oxygen than the amount required to completely oxidize said composition; and burning in the furnace said composition, thereby melting and reducing said iron ore and forming a reduced molten iron.

8. In the production of pig iron and steel, the steps of charging a furnace with an iron-containing material; introducing into the furnace a fluid containing oxygen and about 1% of said iron-containing material of a composition essentially consisting of 20% iron and titanium and the remainder of aluminum and silicon in an amount of 10–70% aluminum and 70–10% silicon; burning said composition in the furnace; charging the furnace with an additional amount of said composition sufficient upon burning to melt and reduce said iron-containing material; and burning in the furnace said additional composition, thereby melting and reducing said iron-containing material and forming a reduced molten iron.

References Cited in the file of this patent
UNITED STATES PATENTS

| Number | Name | Date |
|---|---|---|
| 837,160 | Vautin | Nov. 27, 1906 |
| 1,537,709 | Sicard | May 12, 1925 |
| 2,069,758 | Hayes et al. | Feb. 9, 1937 |
| 2,137,863 | Strauss | Nov. 22, 1938 |
| 2,300,959 | Pirani | Nov. 3, 1942 |

FOREIGN PATENTS

| Number | Country | Date |
|---|---|---|
| 581,079 | Germany | July 20, 1933 |